United States Patent [19]
Ellul

[11] Patent Number: 5,126,501
[45] Date of Patent: Jun. 30, 1992

[54] ELASTOMERIC COMPOSITIONS AND TIRE BELT STRUCTURE

[75] Inventor: Maria D. Ellul, Silver Lake, Ohio

[73] Assignee: General Tire, Inc., Akron, Ohio

[21] Appl. No.: 644,523

[22] Filed: Jan. 23, 1991

[51] Int. Cl.⁵ .......................... C08K 5/09; C08F 36/06
[52] U.S. Cl. .................................. 524/394; 524/397; 524/399; 525/332.6; 525/370
[58] Field of Search .............. 524/397, 399, 394; 525/332.6, 370

[56] References Cited

U.S. PATENT DOCUMENTS

| | | | |
|---|---|---|---|
| 3,823,122 | 7/1974 | Schuh et al. | 260/85.1 |
| 4,056,269 | 11/1977 | Pollitt et al. | 273/218 |
| 4,192,790 | 3/1980 | McKinstry et al. | 260/31.2 |
| 4,441,946 | 4/1984 | Sharma | 156/307 |
| 4,495,326 | 1/1985 | Donatelli et al. | 524/533 |
| 4,529,770 | 7/1985 | Hayes et al. | 524/445 |
| 4,611,810 | 9/1986 | Kamata et al. | 273/218 |
| 4,713,409 | 12/1987 | Hayes et al. | 524/518 |
| 4,929,684 | 5/1990 | Roland et al. | 525/274 |

FOREIGN PATENT DOCUMENTS

WO90/08170 7/1990 PCT Int'l Appl.
1364138 8/1974 United Kingdom.

OTHER PUBLICATIONS

Sartomer Company brochure sheet for CHEMLINK 7000.

*Primary Examiner*—Paul R. Michl
*Assistant Examiner*—Peter Szekely
*Attorney, Agent, or Firm*—Calfee, Halter & Griswold

[57] ABSTRACT

An improved composition for steel cord reinforced tire belts and tire belts as well as other products made from such composition are provided. The composition includes natural or butadiene rubber or mixtures thereof. A sulfur producing curing agent is present. The composition also includes both carbon black and silica as well as up to about 12 phr of zinc dimethacrylate or other metal salt of a low molecular weight organic acid. A silane may also be present.

30 Claims, No Drawings

ELASTOMERIC COMPOSITIONS AND TIRE BELT STRUCTURE

TECHNICAL FIELD

This invention relates generally to improved elastomeric compositions and more particularly to improved elastomeric compositions formed of natural or diene rubbers, including copolymers such as styrene butadiene rubbers, which are especially useful for forming reinforced tire belts or the like.

BACKGROUND OF THE INVENTION

Various rubber compounds are formulated using a variety of different additive agents to cure the rubber and control and modify various properties of the rubber depending upon the desired end use. In formulating the compositions, these additives are selected for their usefulness o effect on modifying or providing the desired properties so as to achieve an end product which has the best attainable balance of properties depending upon the intended use of the rubber composition. Unfortunately, any particular addition agent might well and, in fact, usually does affect more than one of the properties of the final composition. Thus, while any particular additive may improve or provide a desired modification of one property, the same ingredient may degrade or undesirably affect one or more of the other properties. Thus, it is usually necessary to add a variety of different ingredients not only to change or modify the desired properties, but also to counteract the undesirable modifications or changes which are wrought or affected by other additives. Hence, in many rubber compositions there are a large number of ingredients that are added in controlled proportions in an attempt to optimize the properties for the desired end product.

For example, in rubber compositions which are for a tire belt skim, often referred to as belt skim or cord reinforced rubber composites, or steel cord-rubber composites, certain characteristics are required. The performance of these steel cord-rubber composites as used in tires, conveyor belts, etc. is determined by the properties of the individual components (i.e. steel cord and rubber individually), as well as by the adhesion between the components. To obtain good adhesion between steel cords and rubber, the steel cords used in tires or reinforced composite articles are conventionally plated with brass which is an alloy of copper and zinc. The adhesion bond between brass and rubber is formed in situ during or concurrent with the vulcanization (curing) of the rubber with sulfur. Thus, sulfur in the rubber compound has a dual purpose; i.e. it vulcanizes or crosslinks the rubber, and also promotes adhesion of the rubber to the brass plated steel cords.

The bond between brass and rubber is believed to involve the formation of a thin layer of copper sulfide. The exact stoichiometry of this copper sulfide is not known completely; however, the formation of this bond and its durability is of the utmost importance in performance and durability. The formulation or composition of the rubber in a belt skim application is therefore very critical because of several requirements that must be fulfilled, namely (1) good processing characteristics; (2) the resulting rubber must be very resistant to fatigue crack propagation ("tough" rubber); (3) the resulting adhesive bond between brass and rubber must be strong and durable, including resistance to moisture and corrosion actions in general.

Good processing characteristics refer to a rubber stock of moderate viscosity and a good balance between scorch time ($t_{s2}$) and cure times ($t_{25}$, $t_{90}$, $t_{100}$). A very short scorch time is normally not good because it does not give enough processing time for forming or shaping operations (e.g. time for the rubber to flow during calendaring, extrusion, and molding). On the other hand, a scorch time that is too long is undesirable since the total cure cycle will be prolonged and therefore decrease productivity. Similarly, too long a cure time will require excessive residence time of the tire in the mold and also result in too long an overall cure time to be commercially effective.

However, as stated above, in selecting the desired addition agents to provide these desired properties, while any given agent may have a beneficial effect on one of these properties, it may have a serious detrimental or deleterious effect on one or more of the other properties. For example, the addition of triethanolamine to a belt skim containing silica may have some beneficial effect by reducing cure time, but it has a very serious detrimental effect on the adhesion of the belt skim composition to the plated steel wires. This is just one example of many of how a particular additive may favorably or beneficial change one property and at the same time adversely affect another property, even to the extent that such an addition is commercially useless.

There have been many different prior art proposals for various combinations o additives to various types of rubber compounds.

U.S. Pat. No. 4,192,790 assigned to Uniroyal discloses the use of various additives for altering certain characteristics of different types of rubber compounds. This patent discloses, for example, the use of both peroxide and sulfur type curing agents, as well as the addition of silica, carbon black, and basic zinc methacrylate to achieve certain results. However, this patent does not disclose specifically a sulfur cured natural or diene rubber which includes high amounts of both silica and carbon black, as well as a zinc methacrylate and does not disclose a zinc dimethacrylate at all.

U.S. Pat. No. 3,823,122 assigned to Nalco Chemical Company discloses a sulfur cured styrene butadiene rubber to which carbon black and zinc methacrylate are added. It does not disclose the use of silica in this composition.

UK Patent No. 1,364,138 assigned to Acushnet Company discloses a polybutadiene rubber which has silica and zinc oxide and methacrylic acid added thereto. It does not suggest the addition of carbon black nor is this a sulfur cured product.

U.S. Pat. No. 4,929,684, assigned to Bridgestone/Firestone Inc., discloses a natural rubber and styrene butadiene rubber having carbon black and zinc oxide and stearic acid, as well as zinc dimethacrylate added thereto. It does not suggest the addition of silica.

U.S. Pat. No. 4,529,770, assigned to Firestone Tire and Rubber, discloses a peroxide cured rubber as opposed to a sulfur cured rubber which includes silica or carbon black and zinc dimethacrylate.

U.S. Pat. No. 4,495,326 assigned to Firestone Tire and Rubber Company, Inc., discloses a sulfur curable rubber including carbon black and zinc dimethacrylate. It does not teach the use of silica.

U.S. Pat. No. 4,056,269 discloses a golf ball made of a peroxide cured rubber which includes the addition of zinc oxide and methacrylic acid and zinc methacrylate. Various fillers are suggested including silica and carbon black but no specific indication is given of a sulfur cured rubber compound with carbon black and silica as well as zinc dimethacrylate.

U.S. Pat. No. 4,611,810 assigned to Toyo Denka Kogyo Co. Ltd. and Kamatari Co. Ltd. also discloses a golf ball formulation which is preferably peroxide cured, but contains a minor amount of sulfur in the formulation. No examples of silica and carbon black fillers are given.

U.S. Pat. No. 4,713,409 assigned to Firestone Tire and Rubber Co. discloses a method of producing zinc dimethacrylate and also a peroxide cured rubber with dimethacrylate added thereto.

U.S. Pat. No. 4,441,946 assigned to General Tire and Rubber Company discloses a sulfur cured natural rubber and styrene butadiene rubber mix which includes both carbon black and silica but does not disclose the use of zinc methacrylate.

A brochure from Sartomer Co. discloses a silica filled sulfur cured natural rubber compound with zinc dimethacrylate, but does not disclose carbon black.

None of the above mentioned references teach or suggest a sulfur cured natural or diene rubber having specifically both silica and carbon black and zinc dimethacrylate.

SUMMARY OF THE INVENTION

According to the present invention, an improved elastomeric rubber composition and reinforced products especially tire belts made therefrom are provided. The rubber composition includes an elastomer selected from the group of natural rubber and butadiene rubbers including copolymers of butadiene rubber and mixtures thereof. Added to the rubber or rubbers are an effective amount of carbon black, an effective amount of silica, a vulcanizing agent including sulfur and/or a sulfur compound and an effective amount up to about 12 parts by weight per hundred parts of rubber of a metal salt of a low molecular weight unsaturated organic acid, preferably zinc dimethacrylate. One or more of the following ingredients may be added either in addition to the carbon black or as substitutes for some or all of the carbon black. These ingredients include silanes, a formaldehyde polymer tackifier, a formaldehyde resin such as a resorcinol polymer and one or more amines. For reinforced tire belt compositions, it is conventional and desirable that the carbon black be present at least to a certain extent. However, if reduced amounts of carbon black are desired, the optional ingredients either alone or in combination will be effective to reduce the cure time in this silica containing sulfur cured diene and/or natural rubber compound with the metal salt of the low molecular weight unsaturated organic acid.

DESCRIPTION OF THE PREFERRED EMBODIMENT

Among the many other uses of vulcanized rubber compositions is its use for reinforced tire belts. A tire belt may be reinforced with various materials that are formed into cords. Many types of materials such as synthetics and steel wire (conventionally with a brass coating plated thereon) ar used. In selecting the elastomeric composition for such a reinforced tire belt, it is desirable to optimize various characteristics and properties of the final belt composition as noted above. Briefly, the characteristics include good adhesion to the cords which are embedded therein so that the cords do not separate or pull out. The elastomeric material should have a reasonably short scorch time so that the curing process can start quickly but the scorch time must be at least long enough for the tire belt to be calendared and for sufficient time in the mold, to form into the necessary tire shape before it has reached this particular state of cure. (Scorch time or $t_{s2}$ represents the time to incipient cure which is a measure of processing latitude. As defined by ASTM standard D-2084, scorch time or $t_{s2}$ is equal to the time in minutes for two inch-pounds-force rise in torque above the minimum torque, $T_{min}$.

Further, it is also desirable to have a reasonably short cure time as measured by $t_{25}$, $t_{90}$, and $t_{100}$ especially $t_{90}$ and $t_{100}$ so that the tire can be removed from the mold fairly quickly and the cure can proceed while the tire is cooling outside the mold. ($t_{25}$, $t_{90}$, and $t_{100}$ refer to the time necessary to reach the respective percent of cure represented by the subscript as measured by the oscillating disc cure meter as defined in ASTM standard D-2084 test method). Thus, both relatively short scorch times and quite low cure times are desirable characteristics of the composition of rubber for reinforced tire belts. The composition also should have a moderate viscosity.

Further, it is desired that the tire belt material have rather high tear and fatigue resistance and a high modulus of elasticity at low to moderate strains. The composition when formed into a tire should have a high pull-out force to resist the cords pulling out and a high percent of residual rubber coverage after pull-out.

All of these various properties can be altered to a certain extent by the addition of different additives or materials to the tire rubber "recipe" for the belt skim.

For example, conventional belt skims contain mostly carbon black reinforcing filler with only a small amount of silica, e.g. 5-10 parts of silica per hundred of rubber (phr); normally the silica is of the precipitated type. This silica is part of the adhesion package normally referred to in the industry as the RFS (Resorcinol-Formaldehyde-Silica) system. For example, one standard belt skim formulation (Table VII, Composition 7A) contains 5 phr HiSil, a precipitated silica sold by PPG Industries, Inc.

The following are the ingredients together with their functions which are conventionally present in truck, passenger, and giant tire belt skim formulations.

Natural Rubber: (NR) 100 phr—Most belt skims employ an all NR compound although some skims utilize a blend of NR and Polybutadiene Rubber (BR). BR and/or NR is usually the major component of the blend. As is conventional, the amount of rubber is reported as 100 parts, and all ingredients are reported as parts per hundred of rubber, (phr) by weight.

Carbon Black: (of the reinforcing type), e.g. 60 phr HAF (high abrasion furnace black). The filler, if of the reinforcing type (small particle size, large surface area), as used in belt skims strengthens the rubber, especially at elevated temperatures, i.e. increases modulus, tear strength, stress at break (also referred to as tensile strength), strain or elongation at break, energy-to-break, fatigue crack propagation resistance and abrasion resistance. Carbon black also generally increases cure rates.

Zinc Oxide: 3-10 phr is an activator for vulcanization reactions, increases modulus and other strength properties.

Stearic Acid: 0.5-2 phr, reacts with zinc oxide to form zinc stearate which is then active in vulcanization reactions with sulfur and the accelerator.

Sulfur: about 5 phr (Note: in same belt skim formulation, was 6.25 phr Crystex, a trade name of insoluble sulfur which is an 80% active insoluble sulfur with 20% aromatic petroleum oil). Sulfur is the main crosslinking agent which reacts with the polymer (rubber) to form a carbon-sulfur$_x$-carbon crosslink where x can be 1 or greater; (i.e. monosulfide or polysulfide crosslinks).

Accelerator, e.g. DCBS: dicyclohexyl benzthiazyl sulfenamide which is a primary accelerator. It reacts with sulfur in the presence of zinc oxide and stearic acid to form a carbon-sulfur$_x$-carbon crosslink. It also accelerates these reactions.

Aromatic petroleum oil: about 8 phr, e.g. ASTM Type 101—This is to improve processing, dispersion of carbon black, and to lower viscosity. Without the oil, the compound will be very dry and difficult to process.

Manobond: A complex organic compound based on cobalt and boron (a modified cobalt boroacylate) sold under the tradename Manobond by Manchem Ltd. This improves adhesion of rubber to metals such as steel, brass, or zinc. Prevents corrosion of the brass-rubber bond when in contact with water and/or oxygen, etc.

Wingstay 300: about 2.0 phr; An antioxidant, N-1,3 dimethylbutyl, N'-phenyl-p-phenylenediamine, sold under the tradename Wingstay 300 by Goodyear Chemical.

Tackifier: about 3.0 phr; A tackifier which is formaldehyde polymer with parateriary octyl phenol (a modified alkylphenolformaldehyde). Its exact function is unknown but is thought to stiffen and knead together ingredients in the formulation.

Cyrez Resin: about 3.3 phr; A modified melamineformaldehyde resin and inert carrier sold under the tradename Cyrez by American Cyanamid. This may enhance adhesion of the steel cords to rubber and also stiffens the rubber.

Resorcinal Formaldehyde Resin: about 2 phr; improves adhesion

Precipitated Silica: up to about 5 phr

As indicated above, small amounts of silica, e.g. up to about 5 to 10 phr have been used in the past. However, increasing the silica above this level adversely affects both the scorch times and especially the cure times.

According to this invention, a technique for replacing a part of the carbon black by reinforcing silica is provided wherein the improvements of silica are obtained without the substantial detriments. The main reason for using increased silica in a belt skim is to improve the tear and fatigue crack propagation properties. The silica is preferably a fumed silica of surface area of about 200 m$^2$/g and nominal particle diameter of about 0.014 microns. A suitable silica is manufactured by Cabot Corp. and sold under the tradename CAB-O-SIL MS7. There should be between 10 and 80 phr of silica, and between 20 and 80 phr of carbon black, and preferably this range should be between 25 and 35 phr silica and between 25 and 50 phr carbon black. Optimally, there should be about 30 phr of silica and 30 phr of carbon black. The amounts of silica and carbon black vary depending on the particular grades used.

Precipitated silica ca also be used in place of fumed silica as long as it is of the reinforcing type. Precipitated silicas of comparable particle size to CAB-O-SIL MS7 are sold under the tradenames Ultrasil VN3 by Degussa Corp and HiSil 132 by PPG Industries. Fumed silica is preferred for belt skims over precipitated silica because the former is hydrophobic, i.e. it does not attract water, which is a desirable trait if the rubber is to used for a tire belt skim application where normally it is desired to exclude water. As indicated above, in the past, the use of significant amounts of silica in belt skims, e.g. above 10 phr, with carbon black has caused curing problems. These problems are that while the scorch time may be relatively low, the cure times, especially $t_{90}$ and $t_{100}$ are inordinately long. The reason for this is not completely understood. However, both precipitated and especially fumed silicas are lower in pH than most carbon blacks and the slow down in cure rate (increase in cure time) is believed to be caused at least in part by this lower pH of the silica. Also accelerators have a tendency to be adsorbed on the surface active sites of silica so that more accelerators may be needed to achieve cure rates and state of cure comparable to that of the same compound without silica. There are several ways to alleviate this problem of slow curing with silica. They are:

(1) Adding activators for silica, e.g. glycols such as diethylene glycol or polyethylene glycol and amines such as triethanolamine. These materials are suitable to add for applications other than belt skims; however, triethanolamine is particularly bad for adhesion;

(2) Silane coupling agents can be used. However, in larger amounts which may be necessary to achieve the proper cure characteristics, the moduli at high strains will tend to increase substantially and may increase so much that the tear properties and stress strain curve of the compound containing silica will become similar to that of the all carbon black filled compound. Thus, the benefits of the silica are lost.

However, it has been found that it is possible to obtain the benefits of both the silica and carbon black in a sulfur cured natural or butadiene rubber system by the addition of relatively small amounts of zinc dimethacrylate or other metal salts of low molecular weight unsaturated organic acids which will counteract the most serious detrimental effect of long cure times. Specifically, it has been found that the addition of zinc dimethacrylate or other metal salt of a low molecular weight unsaturated organic acid to a tire belt skim composition which includes both carbon black and silica will actually cause a significant decrease in cure-time without adversely affecting scorch time and steel cord adhesion while retaining the beneficial aspects of the silica. Additional additives can also be used.

Table I below shows the effect of the addition, individually, of various ones of these additives including carbon black in a sulfur cured natural rubber composition filled with silica. Table I shows the effect only with respect to the viscosity and curing characteristics of the rubber composition. The base formulation is 100 parts of natural rubber, 30 parts of CAB-O-SIL MS7, 5 parts of zinc oxide, 1.5 parts of stearic acid, 4 parts of aromatic oil, 2.5 parts of sulfur, 1.0 parts of DCBS and the other ingredients as shown in Table I. As used herein, "parts per hundred", or phr means the parts based on 100 parts of rubber.

TABLE I

Effect of Zinc Dimethacrylate in Model NR Compounds Filled with Silica
Formulation: NR 100, Cab-o-sil MS7 30, ZnO 5, Stearic Acid 1.5, Oil 4, Sulfur 2.5, DCBS 1.0.
Other Ingredients as Below:

| Compound No. | 1A | 1B | 1C | 1D | 1E | 1F | 1G | 1H | 1J |
|---|---|---|---|---|---|---|---|---|---|
| Zinc Dimethacrylate | 0 | 4 | 0 | 4 | 0 | 4 | 0 | 4 | 0 |
| Tackifier | 0 | 0 | 3 | 3 | 0 | 0 | 0 | 0 | 0 |
| Wingstay 300 | 0 | 0 | 0 | 0 | 2 | 2 | 0 | 0 | 0 |
| Resorcinol (B-19-S) | 0 | 0 | 0 | 0 | 0 | 0 | 2.4 | 2.4 | 0 |
| Cyrez | 0 | 0 | 0 | 0 | 0 | 0 | 0 | 0 | 3.3 |
| Manobond | 0 | 0 | 0 | 0 | 0 | 0 | 0 | 0 | 0 |
| Silane X50S | 0 | 0 | 0 | 0 | 0 | 0 | 0 | 0 | 0 |
| HAF | 0 | 0 | 0 | 0 | 0 | 0 | 0 | 0 | 0 |
| Mooney Viscosity, ML-4', 100° C. | 67 | 50 | 56 | 41 | 67 | 50 | 60 | 50 | 56 |
| Curing Characteristics ODR at 150° C. | | | | | | | | | |
| $T_{min}$ inch lb. | 11 | 5.1 | 7.3 | 4.0 | 11.5 | 5.3 | 9.5 | 5.4 | 10.0 |
| $T_{max}$ inch lb. | 28 | 24 | 18.3 | 22.0 | 29 | 21.5 | 21.5 | 23.0 | 28.5 |
| $t_{s2}$, minutes | 20 | 28 | 22 | 21 | 13 | 24 | 29 | 29 | 20 |
| $t_{25}$ minutes | 26 | 37 | 26 | 26 | 17 | 30 | 45 | 36 | 25 |
| $t_{90}$, minutes | 119 | 64 | 126 | 50 | 76 | 56 | 159 | 68 | 105 |
| $t_{100}$, minutes | 150 | 80 | 160 | 68 | 100 | 70 | 190 | 90 | 130 |

| Compound No. | 1K | 1L | 1M | 1N | 1P | 1Q | 1R | 1S | 1T |
|---|---|---|---|---|---|---|---|---|---|
| Zinc Dimethacrylate | 4 | 0 | 4 | 0 | 4 | 0 | 4 | 0 | 4 |
| Tackifier | 0 | 0 | 0 | 0 | 0 | 0 | 0 | 0 | 0 |
| Wingstay 300 | 0 | 0 | 0 | 0 | 0 | 0 | 0 | 0 | 0 |
| Resorcinol (B-19-S) | 0 | 0 | 0 | 0 | 0 | 0 | 0 | 0 | 0 |
| Cyrez | 3.3 | 0 | 0 | 0 | 0 | 0 | 0 | 0 | 0 |
| Manobond | 0 | .78 | .78 | 0 | 0 | 0 | 0 | 0 | 0 |
| Silane X50S | 0 | 0 | 0 | 1.5 | 1.5 | 3.0 | 3.0 | 0 | 0 |
| HAF | 0 | 0 | 0 | 0 | 0 | 0 | 0 | 30 | 30 |
| Mooney Viscosity, ML-4', 100° C. | 47 | 55 | 38 | 56 | 51 | 56 | 44 | 105 | 56 |
| Curing Characteristics ODR at 150° C. | | | | | | | | | |
| $T_{min}$ inch lb. | 5.0 | 8.6 | 4.1 | 9.1 | 5.8 | 7.9 | 2.4 | 20.0 | 6.0 |
| $T_{max}$ inch lb. | 27.5 | 23.0 | 26.5 | 25.8 | 26.0 | 26.5 | 14.6 | 48 | 36.2 |
| $t_{s2}$, minutes | 22 | 22 | 37 | 17 | 16 | 12 | 15 | 7 | 7 |
| $t_{25}$ minutes | 30 | 26 | 54 | 22 | 23 | 19 | 18 | 11 | 10 |
| $t_{90}$, minutes | 54 | 77 | 100 | 88 | 48 | 60 | 38 | 100 | 27 |
| $t_{100}$, minutes | 70 | 110 | 130 | 130 | 65 | 100 | 55 | 150 | 40 |

Composition 1A is the base or comparison composition which does not contain any zinc dimethacrylate or any of the other additives such as carbon black, silane, etc. but does contain silica. As can be seen, the scorch time of Composition 1A is 20 minutes, the $t_{25}$ cure time is 26 minutes, the $t_{90}$ cure time is 119 minutes and the $t_{100}$ cure time is 150 minutes. These cure times are inordinately long, and in fact, the scorch time is also quite long; hence, such a composition would not be useful as a tire belt skim for a commercial application. Composition 1B adds four parts of zinc dimethacrylate to the recipe of Composition 1A. It can be seen that this actually increases the scorch time. This also increases the $t_{25}$ cure time, although it does decrease the $t_{90}$ and $t_{100}$ cure times somewhat. Even these values are extremely high and again this composition would not be useful for commercial purposes as a tire belt skim.

The addition of various other additives with and without zinc dimethacrylate is shown in the various compositions of 1A through 1T. Of particular note are Compositions 1S and 1T. It can be seen in these compositions that when carbon black is added, as in Composition 1S, without the addition of zinc dimethacrylate, the scorch time decreases dramatically to seven minutes.

Also, the $t_{25}$ cure time is reduced to 11 minutes. However, the $t_{90}$ and $t_{100}$ cure times are still essentially as great as that of the composition of example A, and hence much too long for this composition to be commercially useful. However, as can be seen from Composition T, if 4 parts of zinc dimethacrylate are added the scorch time remains essentially unaffected, i.e. it stays at 7 minutes, and the $t_{25}$ cure time is not changed significantly, changing only from 11 to 10 minutes which is not statistically significant. However, the $t_{90}$ and $t_{100}$ times are significantly reduced, $t_{90}$ being reduced from 100 minutes to 27 minutes and $t_{100}$ being reduced from 150 minutes to 40 minutes. This indicates that a tire belt skim made of a composition of natural rubber or butadiene rubber and which includes both carbon black and silica and also zinc dimethacrylate, with a sulphur curing agent, is commercially feasible.

Table II is comparable to Table I, i.e. it is the same base type composition for a tire belt skim, but in this instance all of the additional conventional components are added as a starting point and they are then omitted individually to determine the effect of omitting any one alone.

TABLE II

Effect of Zinc Dimethacrylate on Tire Belt Skim-Type Compounds
Formulation: NR 100, Cab-o-sil MS7 30, ZnO 10, Stearic Acid 2.0, Oil 8,
Crystex 6.25, CTP 0.1, DCBS 1.0, HiSil 5, Other Variations as Below:

| Compound No | 2A | 2B | 2C | 2D | 2E | 2F | 2G | 2H | 2J |
|---|---|---|---|---|---|---|---|---|---|
| Zinc Dimethacrylate | 0 | 4 | 0 | 4 | 0 | 4 | 0 | 4 | 0 |
| Tackifier | 3 | 3 | 0 | 0 | 3 | 3 | 3 | 3 | 3 |

TABLE II-continued

Effect of Zinc Dimethacrylate on Tire Belt Skim-Type Compounds
Formulation: NR 100, Cab-o-sil MS7 30, ZnO 10, Stearic Acid 2.0, Oil 8,
Crystex 6.25, CTP 0.1, DCBS 1.0, HiSil 5, Other Variations as Below:

| | | | | | | | | | |
|---|---|---|---|---|---|---|---|---|---|
| WS300 Antioxidant | 2 | 2 | 2 | 2 | 0 | 0 | 2 | 2 | 2 |
| Resorcinol | 2.4 | 2.4 | 2.4 | 2.4 | 2.4 | 2.4 | 0 | 0 | 2.4 |
| Cyrez | 3.3 | 3.3 | 3.3 | 3.3 | 3.3 | 3.3 | 3.3 | 3.3 | 0 |
| HAF | 30 | 30 | 30 | 30 | 30 | 30 | 30 | 30 | 30 |
| Manobond | 0.78 | 0.78 | 0.78 | 0.78 | 0.78 | 0.78 | 0.78 | 0.78 | 0.78 |
| X50S (50% S169) | 1.5 | 1.5 | 1.5 | 1.5 | 1.5 | 1.5 | 1.5 | 1.5 | 1.5 |
| A189 Silane | — | — | — | — | — | — | — | — | — |
| Mooney Viscosity, ML-4', 100° C. | 61 | 59 | 68 | 63 | 53 | 61 | 61 | 52 | 65 |
| Curing Characteristics ODR at 150° C. | | | | | | | | | |
| $T_{min}$, inch lb. | 8 | 7 | 9 | 8 | 8 | 6 | 7 | 6 | 8 |
| $T_{max}$, inch lb. | 49 | 57 | 52 | 59 | 49 | 55 | 50 | 58 | 38 |
| $t_{s2}$, minutes | 3.5 | 4.1 | 3.6 | 4.1 | 4.9 | 5.5 | 6.2 | 3.7 | 7.8 |
| $t_{25}$, minutes | 14 | 7 | 14 | 7 | 16 | 11 | 15 | 6 | 16 |
| $t_{90}$, minutes | 51 | 21 | 44 | 20 | 74 | 28 | 46 | 20 | 69 |
| $t_{100}$, minutes | 95 | 35 | 85 | 35 | 110 | 50 | 80 | 35 | 100 |

| Compound No. | 2K | 2L | 2M | 2N | 2P | 2Q | 2R | 2S | 2T |
|---|---|---|---|---|---|---|---|---|---|
| Zinc Dimethacrylate | 4 | 0 | 4 | 0 | 4 | 0 | 4 | 0 | 4 |
| Tackifier | 3 | 3 | 3 | 3 | 3 | 3 | 3 | 3 | 3 |
| WS300 Antioxidant | 2 | 2 | 2 | 2 | 2 | 2 | 2 | 2 | 2 |
| Resorcinol | 2.4 | 2.4 | 2.4 | 2.4 | 2.4 | 2.4 | 2.4 | 2.4 | 2.4 |
| Cyrez | 0 | 3.3 | 3.3 | 3.3 | 3.3 | 3.3 | 3.3 | 3.3 | 3.3 |
| HAF | 30 | 0 | 0 | 30 | 30 | 30 | 30 | 30 | 30 |
| Manobond | 0.78 | 0.78 | 0.78 | 0 | 0 | 0.78 | 0.78 | 0.78 | 0.78 |
| X50S (50% S169) | 1.5 | 1.5 | 1.5 | 1.5 | 1.5 | 0 | 0 | 0 | 0 |
| A189 Silane | — | — | — | — | — | — | — | 0.26 | 0.26 |
| Mooney Viscosity, ML-4', 100° C. | 59 | 41 | 34 | 70 | 62 | 60 | 47 | 56 | 55 |
| Curing Characteristics ODR at 150° C. | | | | | | | | | |
| $T_{min}$, inch lb. | 6 | 5 | 4 | 10 | 7 | 7 | 5 | 7 | 7 |
| $T_{max}$, inch lb. | 45 | 31 | 40 | 46 | 52 | 45 | 52 | 44 | 56 |
| $t_{s2}$, minutes | 6.4 | 8.7 | 5.3 | 4 | 5 | 4 | 6 | 4 | 4 |
| $t_{25}$, minutes | 10 | 20 | 9 | 17 | 9 | 17 | 10 | 15 | 8 |
| $t_{90}$, minutes | 27 | 51 | 24 | 98 | 28 | 60 | 26 | 51 | 23 |
| $t_{100}$, minutes | 45 | 90 | 38 | 140 | 52 | 105 | 45 | 95 | 40 |

As can be seen, Table II shows that with all of these additional additives, without the use of zinc dimethacrylate, the scorch time is significantly reduced. However, as shown in example 2A, the $t_{100}$ time is still extremely high at 95 minutes and $t_{90}$ is 51 minutes. Yet, by adding the zinc dimethacrylate as shown in Example 2B, $t_{100}$ is reduced to 35 minutes, which is a dramatic reduction, and $t_{90}$ is also dramatically reduced from 51 to 21 minutes while the scorch time $t_{s2}$ is not changed significantly. The effect of the various other additives being omitted individually is shown in the various compositions.

With respect to Composition 2L, which does not contain any carbon black or zinc dimethacrylate, the scorch time is still significantly reduced to 8.7 minutes, although not nearly as low as most of the other compositions which contain carbon black. Composition 2J has the next longest scorch time. Again, in this case the $t_{25}$, $t_{90}$ and $t_{100}$ cure times are significantly reduced by the addition of the zinc dimethacrylate as shown in Composition 2M, even in the absence of carbon black, indicating that the other additives which showed various reducing effects on scorch and cure times in Table I have a cumulative effect. Nevertheless, it is preferred that the carbon black be present for other reasons, as pointed out above, in the various belt skim compositions.

Table III below shows the effect of 2 and 4 phr of zinc dimethacrylate as compared to the absence of zinc dimethacrylate from the composition. Table III also compares zinc dimethacrylate to several other additives which are added rather than the zinc dimethacrylate.

TABLE III

Formulation (phr):
NR 100; ZnO 10.0; Stearic Acid 2.0; HAF 30; Cab-O-Sil MS7 30; Tackifier 3.0; X50S 1.5; Manobond
680-C 0.78; Oil 8.0;
HiSil 5.0; Resorcinol 2.4; Cyrez 3.33; Wingstay 300 2.0; Crystex 6.25; CTP 0.10; DCBS 1.0; Other Ingredients as Below:

| Compound No. | 3A | 3B | 3C | 3D | 3E | 3F | 3G |
|---|---|---|---|---|---|---|---|
| Ingredients, phr | | | | | | | |
| Zinc Dimethacrylate | 0 | 2 | 4 | — | — | — | — |
| PEG (Polyethylene glycol) | — | — | — | 2 | 4 | — | — |
| DEG (Diethylene glycol) | — | — | — | — | — | 4 | — |
| TEA (Triethanolamine) | — | — | — | — | — | — | 4 |
| Physical Properties | | | | | | | |
| Mooney Viscosity, ML-4', 100° C. | 71 | 67 | 64 | 68 | 66 | 68 | 68 |
| ODR at 150° C. | | | | | | | |
| $T_{min}$, inch lb | 6.9 | 7.7 | 7.7 | 8.4 | 8.1 | 8.2 | 8.2 |
| $T_{max}$, inch lb | 43.8 | 47.7 | 53.4 | 50.5 | 49.9 | 57.1 | 57.0 |
| $t_{s2}$, minutes | 5 | 6 | 6 | 6 | 6 | 3 | 2 |
| $t_{25}$, minutes | | 7 | 26 | 36 | 34 | 27 | 34 |

Formulation (phr):
NR 100; ZnO 10.0; Stearic Acid 2.0; HAF 30; Cab-O-Sil MS7 30; Tackifier 3.0; X50S 1.5; Manobond 680-C 0.78; Oil 8.0; HiSil 5.0; Resorcinol 2.4; Cyrez 3.33; Wingstay 300 2.0; Crystex 6.25; CTP 0.10; DCBS 1.0; Other Ingredients as Below:

| Compound No. | 3A | 3B | 3C | 3D | 3E | 3F | 3G |
|---|---|---|---|---|---|---|---|
| t₁₀₀, minutes | 88 | 51 | 44 | 68 | 64 | 54 | 61 |
| Yerzley, Tan Delta | 0.319 | 0.288 | 0.277 | 0.293 | 0.297 | 0.296 | 0.292 |
| E*, MPa | 20.6 | 18.6 | 20.7 | 20.6 | 20.7 | 23.7 | 21.8 |
| Hardness, Shore A | 84 | 81 | 84 | 85 | 85 | 87 | 87 |
| Stress at 10% Strain, MPa | 1.2 | 1.2 | 1.3 | 1.3 | 1.4 | 1.6 | 1.5 |
| Stress at 50% Strain, MPa | 2.6 | 2.7 | 3.1 | 2.8 | 2.7 | 3.4 | 3.3 |
| Stress at 100% Strain, MPa | 4.4 | 4.6 | 5.4 | 4.6 | 4.4 | 5.6 | 5.5 |
| Stress at 200% Strain, MPa | 9.5 | 9.8 | 11.3 | 9.6 | 9.3 | 11.2 | 10.9 |
| Stress at 300% Strain, MPa | 15.2 | 15.5 | 17.2 | 15.3 | 14.9 | 17.3 | 16.5 |
| Tensile Strength, MPa | 22.2 | 22.3 | 20.9 | 21.7 | 20.6 | 20.9 | 20.9 |
| Elongation at Break, % | 434 | 432 | 370 | 419 | 409 | 368 | 388 |
| Energy to Break, MPa | 50 | 50 | 41 | 47 | 47 | 44 | 43 |
| Tear Strength at 25° C., kJ/m² | 45 ± 18 | 56 ± 30 | 60 ± 27 | 45 ± 20 | 53 ± 28 | 64 ± 35 | 44 ± 20 |
| Tear Strength at 100° C., kJ/m² | 41 ± 9 | 48 ± 13 | 50 ± 13 | 54 ± 16 | 65 ± 20 | 47 ± 11 | 32 ± 13 |
| Adhesion, Wire S288, 2 + 2 × 0.25 mm Pullout Force, N (Coverage) | | | | | | | |
| Unaged | — | 526 ± 14 (10) | 577 ± 28 (9) | 530 ± 5 (10) | 503 ± 19 (10) | 493 ± 14 (10) | — |
| Aged, 7 days, 93° C., 95% Relative Humidity | 424 ± 22 (9) | 450 ± 22 (10) | 497 ± 38 (8) | 402 ± 29 (7) | 401 ± 25 (6) | 249 ± 12 (4) | 91 ± 4 (1) |
| Adhesion, Wire S291, 2 + 2 × 0.28 mm Pullout Force, N (Rubber Coverage) | | | | | | | |
| Unaged | 624 ± 18 (9) | 593 ± 25 (10) | 615 ± 32 (9) | 618 ± 32 (9) | 609 ± 30 (9) | — | — |
| Aged, 7 days, 93° C., 95% Relative Humidity | 485 ± 22 (9) | 502 ± 15 (10) | 527 ± 30 (10) | 466 ± 21 (7) | 416 ± 39 (6) | — | — |
| Aged, 14 days, 93° C., 95% Relative Humidity | 450 ± 15 (8) | 460 ± 54 (8) | 483 ± 57 (8) | 381 ± 30 (6) | 331 ± 35 (5) | — | — |

The first thing that is noticeable in Compositions 3B and 3C, which contain 2 and 4 parts per hundred of zinc dimethacrylate, respectively, and especially in Composition 3C, is that $t_{100}$ is significantly improved over that of any other addition. Also the properties given indicate that the adhesion obtained when the DEG and TEA are used as shown in Compositions 3F and 3G are totally unacceptable. The aged pullout especially for the wire S291 is significantly better with the zinc dimethacrylate compositions 3B and 3C as compared to any of the other compositions containing either PEG, DEG or TEA. Thus, it can be seen that the use of zinc dimethacrylate and silica in sulfur cured compositions of natural rubber and butadiene rubbers, in combination with carbon black, improves the tear strength and gives a proper modulus while the zinc dimethacrylate in the presence of carbon black significantly lowers the cure time while further maintaining the scorch time either unaffected or elevating it slightly. The tire cord adhesion is comparable to the control compound 3A. Thus, these outstanding characteristics make this particular composition ideally suited for steel cord reinforced tire belt skims or other components.

Table IV shows the effect of the addition of zinc dimethacrylate at levels of 3, 4 and 6 parts per 100 of rubber.

TABLE IV

Effect of Zinc Dimethacrylate Co-activator on Properties of Natural Rubber Compounds Containing Silica and Carbon Black Fillers
Formulation (phr):
NR 100, ZnO 10.0; Stearic Acid 2.0; Cab-o-Sil MS7 30; HAF 30; Oil 8.0; Tackifier 3.0; X50S 1.5; Manobond 680-C 0.78; HiSil 5.0; Resorcinol 2.4; Cyrez 3.33; Wingstay 300 2.0; Crystex 6.25; CTP 0.10; DCBS 1.0; Other Ingredients as Below:

| Compound No. | 4A | 4B | 4C | 4D |
|---|---|---|---|---|
| Ingredients, phr | | | | |
| Zinc dimethacrylate | 0 | 3 | 4 | 6 |
| Oscillating Disc Rheameter at 150° C. | | | | |
| T_min, inch lb. | 5.0 | 7.4 | 6.9 | 7.2 |
| T_max, inch lb. | 43 | 50 | 52 | 57 |
| t_s2, minutes | 5 | 5 | 5 | 5 |
| t₉₀, minutes | 51 | 24 | 23 | 24 |
| t₁₀₀, minutes | 80 | 40 | 39 | 42 |
| Physical Properties at 25° C. | | | | |
| Yerzley, Tan Delta | 0.312 | 0.230 | 0.252 | 0.321 |
| E*, MPa | 16.1 | 18.5 | 19.1 | 24.4 |
| Hardness, Shore A | 80 | 79 | 81 | 82 |
| Stress at 10% Strain, MPa | 0.9 | 1.0 | 1.1 | 1.2 |
| Stress at 50% Strain, MPa | 2.1 | 2.4 | 2.6 | 3.1 |
| Stress at 100% Strain, MPa | 3.7 | 4.3 | 4.5 | 5.6 |
| Stress at 200% Strain, MPa | 8.2 | 9.4 | 9.5 | 11.8 |
| Stress at 300% Strain, MPa | 13.6 | 15.3 | 15.1 | 17.9 |
| Tensile Strength, MPa | 21.1 | 21.3 | 20.7 | 20.1 |
| Elongation at Break, % | 445 | 401 | 402 | 339 |
| Energy to Break, MPa | 46.7 | 42.3 | 42.4 | 35.2 |
| Tear Strength at 25° C., kJ/m² | 79 ± 28 | 64 ± 32 | 62 ± 32 | 37 ± 22 |
| Adhesion, Wire S303 | | | | |

TABLE IV-continued

Effect of Zinc Dimethacrylate Co-activator on Properties of Natural Rubber Compounds Containing Silica and Carbon Black Fillers
Formulation (phr):
NR 100, ZnO 10.0; Stearic Acid 2.0; Cab-o-Sil MS7 30; HAF 30; Oil 8.0; Tackifier
3.0; X50S 1.5; Manobond 680-C 0.78; HiSil 5.0; Resorcinol 2.4; Cyrez 3.33; Wingstay
300 2.0; Crystex 6.25; CTP 0.10; DCBS 1.0; Other Ingredients as Below:

| Compound No. | 4A | 4B | 4C | 4D |
|---|---|---|---|---|
| Pullout Force, N, (Coverage) | | | | |
| Unaged | 1346 ± 61(7) | 1303 ± 47(7) | 1165 ± 61(6) | — |
| Aged, 7 days, 93° C., 95% Relative Humidity | 1005 ± 27(6) | 981 ± 41(6) | 965 ± 24(6) | — |

As can be seen in Table IV, there is not much significant change or improvement in cure time among the levels at 3, 4 or 6 phr of the zinc dimethacrylate although it does increase the modulus, especially above the level of 4 phr. It is noted, however, that the tear strength of the composition using 6 phr is significantly reduced over that using 3 and 4 phr; hence, the preferred amount of zinc dimethacrylate is in the range of 2 to 4 phr and more preferably about 3 phr to get optimum results although up to 12 phr can be used.

Table V is a comparison of the use of zinc dimethacrylate and zinc monomethacrylate as additives in silica filled NR and styrene butadiene rubber. For NR, the dimethacrylate is significantly better than the monomethacrylate to reduce $t_{90}$ and $t_{100}$, hence zinc dimethacrylate is the preferred addition. It should be noted however that since these experimental compositions did not contain carbon black or other optional additives as in Tables I and II, the scorch time $t_{s2}$ and cure time $t_{25}$ increased significantly with the addition of zinc dimethacrylate. For styrene butadiene rubber, neither the zinc monomethacrylate nor the dimethacrylate were very effective to reduce cure times at least at the levels studied, but the dimethacrylate was marginally better in reducing $t_{90}$.

TABLE V

Evaluation of the Behavior of Zinc Monomethacrylate and Zinc Dimethacrylate in Natural Rubber and Styrene Butadiene Rubber Compounds

| | UNIROYAL PAT. NO. 4,192,790 | | | | GENERAL TIRE VARIANTS OF COMPOUNDS A-D | | | |
|---|---|---|---|---|---|---|---|---|
| Compound No. | 5A | 5B | 5C | 5D | 5E | 5F | 5G | 5H |
| Ingredients, phr | | | | | | | | |
| SMR 5 CV (Natural Rubber) | 100 | 100 | — | — | 100 | — | 100 | 100 |
| SBR 1500 | — | — | 100 | 100 | — | 100 | — | — |
| Hisil 243 LD | 50 | 50 | 55 | 55 | 50 | 55 | 50 | 50 |
| Zinc Oxide | 3.0 | 5.0 | 3.0 | 3.0 | 5.0 | 3.0 | 5.0 | 5.0 |
| Stearic Acid | 1.0 | 1.0 | 1.0 | 1.0 | 1.0 | 1.0 | 1.0 | 1.0 |
| Sulfur | 2.5 | 2.5 | 1.75 | 2.5 | 2.5 | 1.75 | 2.5 | 2.5 |
| MBTS | 1.0 | 1.0 | — | — | 1.0 | 0 | 1.0 | 1.0 |
| TBBS | — | — | 1.0 | 1.0 | — | 1.0 | — | — |
| Zinc Monomethacrylate | — | 2.0 | 0 | 2.0 | — | — | 4 | — |
| Zinc Dimethacrylate | — | — | — | — | 2.0 | 2.0 | — | 4 |
| Mooney Viscosity, ML4', 100° C. | 111 | 76 | 149 | 126 | 62 | 131 | 61 | 67 |
| Curing Characteristics ODR at 150° C. | | | | | | | | |
| $T_{min}$, inch lb. | 19.0 | 16.0 | 24.9 | 15.3 | 9.0 | 15.1 | 7.1 | 7.8 |
| $T_{max}$, inch lb. | 42.0 | 36.0 | 44.9 | 33.0 | 23.0 | 40.0 | 24.0 | 27.0 |
| $t_{s2}$, minutes | 8 | 14 | 37 | 39 | 18 | 33 | 19 | 18 |
| $t_{25}$, minutes | 10 | 20 | 46 | 57 | 22 | 44 | 33 | 22 |
| $t_{90}$, minutes | 94 | 120 | 146 | 141 | 46 | 120 | 48 | 48 |
| $t_{100}$, minutes | 130 | 160 | 170 | 160 | 70 | 160 | 70 | 70 |

Table VI is another table indicating the various properties with different amounts of different additives including precipitated silica, Ultrasil VN3.

TABLE VI

Effect of Type of Accelerator and Silica upon the Action of Co-Activators in Natural Rubber Belt Skim Compounds
Formulation (phr): NR 100, ZnO 10.0; Stearic Acid 2.0; HAF 30; Tackifier 3.0; X50S 1.5; Manobond 680-C 0.78;
HiSil 5.0; Resorcinol 2.4; Cyrez 3.33; Oil 8.0; Wingstay 300 2.0; Crystex 6.25; CTP 0.10; Other Ingredients as Below:

| Compound No. | 6A | 6B1 | 6B2 | 6C | 6D | 6E | 6F | 6G | 6H | 6J | 6K | 6L | 6M |
|---|---|---|---|---|---|---|---|---|---|---|---|---|---|
| Ingredients, phr | | | | | | | | | | | | | |
| Zinc Dimethacrylate | — | 2.0 | 2.0 | 3.0 | 4.0 | — | 4.0 | — | 4.0 | — | 2.0 | 3.0 | 4.0 |
| TBBS | — | — | — | — | — | 0.69 | 0.69 | 1.0 | 1.0 | — | — | — | — |
| DCBS | 1.0 | 1.0 | 1.0 | 1.0 | 1.0 | — | — | — | — | 1.0 | 1.0 | 1.0 | 1.0 |
| Cab-O-Sil MS7 | 30 | 30 | 30 | 30 | 30 | 30 | 30 | 30 | 30 | — | — | — | — |
| Ultrasil VN3 | — | — | — | — | — | — | — | — | — | 30 | 30 | 30 | 30 |
| Mooney Viscosity, ML-4', 100° C. | 62 | 61 | 61 | 60 | 60 | 65 | 60 | 68 | 61 | 64 | 60 | 58 | 59 |
| Curing Characteristics ODR at 150° C. | | | | | | | | | | | | | |
| $T_{min}$, inch lb. | 8 | 8 | 7 | 7 | 7 | 8 | 7 | 9 | 7 | 8 | 7 | 7 | 7 |
| $T_{max}$, inch lb. | 47 | 51 | 52 | 54 | 57 | 44 | 52 | 49 | 53 | 49 | 53 | 55 | 57 |
| $t_{s2}$, minutes | 4 | 5 | 5 | 5 | 4 | 4 | 4 | 3 | 4 | 6 | 6 | 6 | 5 |
| $t_{90}$, minutes | 47 | 23 | 24 | 23 | 23 | 64 | 24 | 45 | 23 | 35 | 27 | 26 | 26 |

TABLE VI-continued

Effect of Type of Accelerator and Silica upon the Action of Co-Activators in Natural Rubber Belt Skim Compounds
Formulation (phr): NR 100. ZnO 10.0: Stearic Acid 2.0: HAF 30: Tackifier 3.0; X50S 1.5; Manobond 680-C 0.78;
HiSil 5.0; Resorcinol 2.4; Cyrez 3.33; Oil 8.0; Wingstay 300 2.0; Crystex 6.25; CTP 0.10; Other Ingredients as Below:

| Compound No. | 6A | 6B1 | 6B2 | 6C | 6D | 6E | 6F | 6G | 6H | 6J | 6K | 6L | 6M |
|---|---|---|---|---|---|---|---|---|---|---|---|---|---|
| $t_{100}$, minutes | 95 | 49 | 50 | 42 | 40 | 120 | 46 | 95 | 44 | 78 | 45 | 42 | 43 |
| Physical Properties at 25° C. | | | | | | | | | | | | | |
| Hardness, Shore A | 81 | 81 | 82 | 82 | 83 | 81 | 80 | 80 | 80 | 82 | 80 | 80 | 84 |
| Stress at 10% Strain, MPa | 1.1 | 1.1 | 1.1 | 1.1 | 1.1 | 1.0 | 1.1 | 1.0 | 1.0 | 1.1 | 1.0 | 1.1 | 1.2 |
| Stress at 50% Strain, MPa | 2.2 | 2.4 | 2.4 | 2.5 | 2.7 | 2.2 | 2.3 | 2.3 | 2.2 | 2.3 | 2.5 | 2.6 | 2.9 |
| Stress at 100% Strain, MPa | 3.6 | 4.0 | 3.9 | 4.3 | 4.7 | 3.4 | 3.8 | 3.7 | 3.6 | 3.8 | 4.3 | 4.6 | 5.1 |
| Stress at 200% Strain, MPa | 7.6 | 8.3 | 8.0 | 9.0 | 9.9 | 7.0 | 8.1 | 7.8 | 7.7 | 7.9 | 8.9 | 9.6 | 10.6 |
| Stress at 300% Strain, MPa | 12.6 | 13.6 | 13.1 | 14.4 | 15.8 | 11.5 | 13.3 | 12.8 | 12.8 | 12.8 | 14.2 | 15.3 | 16.4 |
| Tensile Strength, MPa | 21.3 | 21.5 | 20.8 | 21.4 | 21.5 | 19.8 | 20.4 | 21.3 | 21.4 | 20.2 | 20.2 | 20.2 | 20.0 |
| Elongation at Break, % | 472 | 451 | 449 | 435 | 408 | 483 | 436 | 476 | 464 | 454 | 417 | 391 | 370 |
| Energy to Break, MPa | 50 | 48 | 47 | 47 | 45 | 48 | 44 | 51 | 49 | 46 | 43 | 40 | 38 |

Table VII shows the effect of zinc dimethacrylate and/or diethylene glycol on rubber that contains only 5 phr silica as a part of the RFS package.

Referring now to Table VIII, the properties obtained by the use of various metallic salts of low molecular weight unsaturated organic acids including zinc dimeth-

TABLE VII

Formulation (phr): NR 100, ZnO 10.0; Stearic Acid 2.0, HAF 60; Oil 8.0; Tackifier 3.0;
Manobond 680-C 0.78; HiSil 5.0 Wingstay 300 2.0, Resorcinol 2.4; Cyrez 3.33;
Crystex 6.25; CTP 0.10; DCBS 1.0. Other ingredients as below:

| Compound No | 7A | 7B | 7C | 7D | 7E | 7F |
|---|---|---|---|---|---|---|
| Zinc Dimethacrylate | 0 | 2 | 4 | 0 | 2 | 4 |
| Diethylene Glycol | — | — | — | 4 | 4 | 4 |
| Physical Properties | | | | | | |
| Mooney Viscosity, ML4, 100° C. | 71 | 70 | 67 | 65 | 63 | 61 |
| ODR at 150° C. | | | | | | |
| $T_{min}$, inch lb | 8.5 | 8.4 | 7.6 | 7.9 | 7.7 | 7.2 |
| $T_{max}$, inch lb | 55.7 | 61.3 | 63.7 | 56.5 | 60.1 | 59.9 |
| $t_{s2}$, minutes | 4 | 4 | 4 | 3 | 3 | 3 |
| $t_{90}$, minutes | 23 | 26 | 27 | 20 | 20 | 21 |
| $t_{100}$, minutes | 45 | 43 | 44 | 42 | 34 | 38 |
| Yerzley, Tan Delta | 0.31 | 0.31 | 0.31 | 0.29 | 0.32 | 0.32 |
| E*, MPa | 23.3 | 24.4 | 26.5 | 25.3 | 25.9 | 27.1 |
| Hardness, Shore A | 85 | 87 | 87 | 85 | 87 | 87 |
| Stress at 10% Strain, MPa | 1.3 | 1.5 | 1.6 | 1.4 | 1.5 | 1.6 |
| Stress at 50% Strain, MPa | 3.4 | 4.1 | 4.3 | 3.7 | 4.1 | 4.3 |
| Stress at 100% Strain, MPa | 6.4 | 7.9 | 8.1 | 6.9 | 7.5 | 7.8 |
| Stress at 200% Strain, MPa | 13.8 | 16.9 | 16.1 | 14.6 | 15.0 | — |
| Stress at 300% Strain, MPa | — | — | — | — | — | — |
| Tensile Strength, MPa | 19.8 | 19.6 | 19.2 | 18.4 | 16.2 | 15.6 |
| Elongation at Break, % | 297 | 255 | 249 | 259 | 220 | 204 |
| Energy to Break, MPa | 30.6 | 26.5 | 25.5 | 24.8 | 18.9 | 17.0 |
| Tear Strength at 25° C., kJ/m² | 22 ± 7 | 16 ± 5 | 13 ± 3 | 18 ± 6 | 18 ± 5 | 20 ± 6 |
| Tear Strength at 100° C., kJ/m² | 12 ± 5 | 8 ± 2 | 6 ± 1 | 8 ± 3 | 9 ± 2 | 8 ± 2 |
| Adhesion, Wire S-291, 2 - 2 × 0.28 mm | | | | | | |
| Pullout Force, N, (Rubber Coverage) | | | | | | |
| Unaged | 623 ± 35(10) | 578 ± 30(10) | 433 ± 44(5) | 576 ± 32(10) | 556 ± 38(9) | 337 ± 16(4) |
| Aged, 7 days, 93° C., 95% Relative Humidity | 591 ± 22(7) | 447 ± 47(6) | 302 ± 37(3) | 296 ± 25(9) | 235 ± 29(2) | 162 ± 22(1) |
| Aged, 14 days, 93° C., 95% Relative Humidity | 408 ± 39(7) | 343 ± 36(6) | 248 ± 16(5) | 238 ± 34(4) | 154 ± 14(1) | 126 ± 19(1) |

As can be seen in Table VII, in the absence of significant amounts of silica, the tear strength is significantly lower than that obtained with high levels of silica and zinc dimethacrylate. Also, the zinc dimethacrylate does not significantly lower the cure times nor affect the scorch times and it seems to deteriorate adhesion somewhat.

acrylate is shown. As can be seen from this table, each of these work to some significant extent in lowering cure times of compositions containing relatively higher levels of silica than used conventionally, and none adversely affect scorch time $t_{s2}$. The calcium and barium salts do not seem to be as effective as the zinc salts to increase the modulus.

TABLE VIII

Effect of Various Metal Salts of Acrylic and Methacrylic Acid in Tire Belt Skim Type Compounds
Formulation (phr): NR100; ZnO 10; Stearic acid 2.0; Cab-o-Sil 30; HAF 30; Oil 8.0; X50S 1.5; Manobond 680-C 0.78.;
Hisil 5.0; Resorcinol 2.4; Cyrez 3.33; Wingstay 300 2.0; Crystex 6.25; CTP 0.10 0.10; DCBS 1.0;
Other ingredients as below:

| Compound No. | 8A | 8B | 8C | 8D | 8E | 8F | 8G |
|---|---|---|---|---|---|---|---|
| Ingredients, phr (moles) | | | | | | | |
| Zinc dimethacrylate | | 2 (0.0084) | 3 (0.0126) | 4 (0.0169) | 6 (0.0252) | — | — |
| Calcium dimethacrylate | — | — | — | — | — | 1.7 (0.0084) | 2.5 (0.0169) |

TABLE VIII-continued

Effect of Various Metal Salts of Acrylic and
Methacrylic Acid in Tire Belt Skim Type Compounds
Formulation (phr): NR100; ZnO 10; Stearic acid 2.0; Cab-o-Sil 30; HAF 30; Oil 8.0; X50S 1.5; Manobond 680-C 0.78.;
Hisil 5.0; Resorcinol 2.4; Cyrez 3.33; Wingstay 300 2.0; Crystex 6.25; CTP 0.10 0.10; DCBS 1.0;
Other ingredients as below:

|  |  |  |  |  |  |  |  |
|---|---|---|---|---|---|---|---|
| Barium dimethacrylate | — | — | — | — | — | — | — |
| Zinc diacrylate | — | — | — | — | — | — | — |
| Curing Characteristics ODR at 150° C. | | | | | | | |
| $T_{min}$. inch lb. | 8.0 | 8.0 | 7.4 | 6.9 | 7.2 | 3.7 | 3.1 |
| $T_{max}$. inch lb. | 43 | 48 | 50 | 52 | 57 | 49 | 47 |
| $t_{s2}$. minutes | 5 | 6 | 5 | 5 | 5 | 4 | 6 |
| $t_{90}$. minutes | 51 | 27 | 24 | 23 | 24 | 25 | 24 |
| $t_{100}$. minutes | 90 | 51 | 40 | 39 | 42 | 58 | 43 |
| Physical Properties at 25° C. | | | | | | | |
| Hardness, Shore A | 80 | 81 | 81 | 82 | 83 | 83 | 83 |
| Yerzley Oscillograph Tan Delta | 0.312 | 0.288 | 0.230 | 0.252 | 0.321 | 0.401 | 0.399 |
| Dynamic Modulus, MPa | 16.1 | 18.6 | 18.5 | 19.1 | 20.4 | 18.7 | 16.9 |
| Stress at 10% Strain, MPa | 0.9 | 1.2 | 1.0 | 1.1 | 1.2 | 1.2 | 1.1 |
| Stress at 50% Strain, MPa | 2.1 | 2.7 | 2.4 | 2.6 | 3.1 | 2.3 | 2.3 |
| Stress at 100% Strain, MPa | 3.7 | 4.6 | 4.3 | 4.5 | 5.6 | 3.7 | 3.7 |
| Stress at 200% Strain, MPa | 8.2 | 9.8 | 9.4 | 9.5 | 11.8 | 7.5 | 7.7 |
| Stress at 300% Strain, MPa | 13.6 | 15.5 | 15.3 | 15.1 | 17.9 | 12.4 | 12.8 |
| Tensile Strength, MPa | 21.1 | 22.3 | 21.3 | 20.7 | 20.1 | 19.9 | 20.1 |
| Elongation at Break (%) | 445 | 432 | 401 | 402 | 339 | 453 | 445 |
| Energy to Break, MJ/m$^3$ | 47 | 50 | 42 | 42 | 35 | 45 | 45 |

| Compound No. | 8H | 8I | 8J | 8K | 8L | 8M |
|---|---|---|---|---|---|---|
| Ingredients, phr (moles) | | | | | | |
| Zinc dimethacrylate | — | — | — | — | — | — |
| Calcium dimethacrylate | 7.7 (.0365) | — | — | — | — | — |
| Barium dimethacrylate | — | 2.6 (0.0084) | 5.2 (0.0169) | 11.2 (0.0365) | — | — |
| Zinc diacrylate | — | — | — | — | 1.7 (0.0084) | 3.5 (0.0169) |
| Curing Characteristics ODR at 150° C. | | | | | | |
| $T_{min}$. inch lb. | 2.6 | 4.9 | 5.4 | 3.1 | 4.1 | 3.8 |
| $T_{max}$. inch lb. | 48 | 50 | 50 | 50 | 46 | 48 |
| $t_{s2}$. minutes | 7 | 5 | 5 | 6 | 6 | 6 |
| $t_{90}$. minutes | 26 | 30 | 28 | 25 | 32 | 27 |
| $t_{100}$. minutes | 48 | 62 | 58 | 46 | 71 | 48 |
| Physical Properties at 25° C. | | | | | | |
| Hardness, Shore A | 85 | 84 | 84 | 83 | 81 | 82 |
| Yerzley Oscillograph Tan Delta | 0.401 | 0.354 | 0.353 | 0.353 | 0.338 | 0.345 |
| Dynamic Modulus, MPa | 18.1 | 18.6 | 18.6 | 19.0 | 17.0 | 16.5 |
| Stress at 10% Strain, MPa | 1.3 | 1.2 | 1.2 | 1.2 | 1.2 | 1.2 |
| Stress at 50% Strain, MPa | 2.5 | 2.4 | 2.4 | 2.6 | 2.3 | 2.4 |
| Stress at 100% Strain, MPa | 3.9 | 3.9 | 3.9 | 4.2 | 3.6 | 4.0 |
| Stress at 200% Strain, MPa | 7.7 | 8.2 | 8.2 | 8.4 | 7.4 | 8.1 |
| Stress at 300% Strain, MPa | 12.4 | 13.3 | 13.4 | 13.4 | 12.1 | 13.1 |
| Tensile Strength, MPa | 18.9 | 19.1 | 20.3 | 18.3 | 19.1 | 20.9 |
| Elongation at Break (%) | 441 | 418 | 437 | 407 | 452 | 465 |
| Energy to Break, MJ/m$^3$ | 43 | 41 | 45 | 39 | 44 | 50 |

Table IX shows a comparison of the invention utilizing natural rubber (NR) and styrene butadiene rubber. As can be seen, the invention is effective using styrene butadiene rubber but not to the same extent as when natural rubber is used.

TABLE IX

Effect of Zinc Dimethacrylate on Cure Characteristics of NR Belt
Skim Type Compounds with MBTS Accelerator and SBR Belt Skim Type Compounds
with DCBS Accelerator
Formulation (phr): CAB-O-SIL MS7 30; HAF 30; Silane X50S (50% si 69) 1.5; Manobond 680C 0.78;
Zinc Oxide 10.0; Stearic Acid 2.0; Oil 8.0; Tackifier 3.0; Hisil 5.0; Wingstay 300 2.0;
Resorcinol 2.4; Cyrez 3.33; Crystex 6.25; CTP 0.1; Other Ingredients as below.

| Compound No. | 9A | 9B | 9C | 9D | 9E | 9F | 9G | 9H |
|---|---|---|---|---|---|---|---|---|
| Ingredients, phr | | | | | | | | |
| NR (MV5) | 100 | 100 | 100 | 100 | — | — | — | — |
| SBR 1500 | — | — | — | — | 100 | 100 | 100 | 100 |
| DCBS | — | — | — | — | 1.0 | 1.0 | 1.0 | 1.0 |
| MBTS | 1.0 | 1.0 | 1.0 | 1.0 | — | — | — | — |
| Zinc Dimethacrylate | — | 2 | 3 | 4 | — | 2 | 3 | 4 |
| Curing Characteristics | | | | | | | | |
| Mooney Viscosity, ML-4', 100° C. | 54 | 62 | 60 | 55 | 75 | 78 | 76 | 78 |
| ODR at 150° C. | | | | | | | | |
| $T_{min}$. inch lb. | 6.4 | 7.1 | 7.0 | 6.4 | 7.7 | 7.7 | 7.4 | 7.4 |
| $T_{max}$. inch lb. | 40 | 52 | 53 | 57 | 58 | 65 | 66 | 66 |
| $t_{s2}$. minutes | 3 | 3 | 3 | 3 | 16 | 9 | 8 | 7 |
| $t_{25}$. minutes | 8 | 6 | 5 | 5 | 31 | 15 | 14 | 13 |

TABLE IX-continued

Effect of Zinc Dimethacrylate on Cure Characteristics of NR Belt
Skim Type Compounds with MBTS Accelerator and SBR Belt Skim Type Compounds
with DCBS Accelerator
Formulation (phr): CAB-O-SIL MS7 30; HAF 30; Silane X50S (50% si 69) 1.5; Manobond 680C 0.78;
Zinc Oxide 10.0; Stearic Acid 2.0; Oil 8.0; Tackifier 3.0; Hisil 5.0; Wingstay 300 2.0;
Resorcinol 2.4; Cyrez 3.33; Crystex 6.25; CTP 0.1; Other Ingredients as below.

| Compound No | 9A | 9B | 9C | 9D | 9E | 9F | 9G | 9H |
|---|---|---|---|---|---|---|---|---|
| $t_{90}$, minutes | 48 | 20 | 18 | 18 | 71 | 49 | 44 | 43 |
| $t_{100}$, minutes | 95 | 45 | 35 | 32 | 105 | 95 | 80 | 85 |
| Physical Properties at 25° C. | | | | | | | | |
| Hardness, Shore A | 79 | 82 | 82 | 84 | 83 | 84 | 85 | 85 |
| Stress at 10% Strain, MPa | 0.9 | 1.2 | 1.2 | 1.3 | 1.2 | 1.4 | 1.4 | 1.4 |
| Stress at 50% Strain, MPa | 2.0 | 2.6 | 2.6 | 3.0 | 2.9 | 3.3 | 3.3 | 3.3 |
| Stress at 100% Strain, MPa | 3.4 | 4.3 | 4.5 | 5.1 | 5.3 | 5.8 | 5.9 | 6.0 |
| Stress at 200% Strain, MPa | 7.2 | 8.8 | 9.3 | 10.2 | 12.1 | 12.7 | 12.6 | 12.7 |
| Stress at 300% Strain, MPa | 11.7 | 13.9 | 14.5 | 15.5 | — | — | — | — |
| Tensile Strength, MPa | 17.3 | 20.4 | 20.1 | 19.5 | 16.2 | 16.6 | 15.8 | 16.3 |
| Elongation at Break, % | 431 | 430 | 419 | 384 | 259 | 258 | 250 | 256 |
| Energy to Break, MJ/m³ | 38 | 45 | 44 | 40 | 21 | 22 | 21 | 22 |

As shown earlier in Tables I and II, it has also been found that the addition of silanes in combination with zinc dimethacrylate has a beneficial effect on the curing characteristics of rubber having silica, to some extent when used in place of carbon black (see Table I); but especially when used in addition to carbon black. This is shown in Tables X and X below.

TABLE X

Effect of Zinc Dimethacrylate and 3-Mercaptopropyltrimethoxy Silane (A-189) on Tire Belt Skim-Type
Compounds with Silica. Formulation (phr): NR 100; Zinc Oxide 10; Stearic Acid 2; Cab-o-sil 30; HAF 30;
Tackifier 3; Oil 8; Resorcinol 2.4; Manobond 0.78; Crystex 6.25; DCBS 1; CTP 0.1; HiSil 5;
Other ingredients as below:

| Compound No. | 10A | 10B | 10C | 10D | 10E | 10F | 10G | 10H | 10J |
|---|---|---|---|---|---|---|---|---|---|
| Ingredients, phr or (moles) | | | | | | | | | |
| Zinc Dimethacrylate | — | 2 | 3 | 4 | 6 | — | — | — | — |
| 3-Mercaptopropyl-trimethoxy silane | — | — | — | — | — | 0.26 (.0013) | 0.51 (.0026) | 1.53 (.0078) | 3.32 (.0169) |
| Mooney Viscosity, ML-4', 100° C. | 60 | 53 | 56 | 47 | 52 | 56 | 59 | 64 | 62 |
| Curing Characteristics ODR at 150° C. | | | | | | | | | |
| $T_{min}$, inch lb. | 7.4 | 5.9 | 5.9 | 5.0 | 5.5 | 7.4 | 7.9 | 8.4 | 7.8 |
| $T_{max}$, inch lb. | 45 | 50 | 49 | 52 | 57 | 44 | 48 | 48 | 49 |
| $t_{s2}$, minutes | 4 | 5 | 6 | 6 | 5 | 4 | 3 | 3 | 2 |
| $t_{25}$, minutes | 17 | 11 | 11 | 10 | 9 | 15 | 13 | 8 | 4 |
| $t_{90}$, minutes | 60 | 30 | 27 | 26 | 26 | 51 | 46 | 30 | 19 |
| $t_{100}$, minutes | 105 | 65 | 50 | 45 | 40 | 95 | 95 | 70 | 50 |
| Physical Properties at 25° C. | | | | | | | | | |
| Tan Delta | 0.347 | 0.349 | 0.321 | 0.339 | 0.305 | 0.381 | 0.367 | 0.378 | 0.347 |
| E*, MPa | 21.0 | 20.8 | 18.5 | 19.7 | 22.9 | 21.8 | 24.6 | 21.6 | 21.7 |
| Hardness, Shore A | 80 | 80 | 81 | 82 | 85 | 80 | 81 | 81 | 80 |
| Stress at 10% Strain, MPa | 1.2 | 1.2 | 1.2 | 1.2 | 1.4 | 1.0 | 1.1 | 1.0 | 1.1 |
| Stress at 50% Strain, MPa | 2.4 | 2.6 | 2.5 | 2.8 | 3.1 | 2.2 | 2.6 | 2.5 | 2.7 |
| Stress at 100% Strain, MPa | 3.8 | 4.1 | 4.1 | 4.6 | 4.9 | 3.6 | 4.3 | 4.4 | 4.8 |
| Stress at 200% Strain, MPa | 8.0 | 8.3 | 8.3 | 9.2 | 9.7 | 7.7 | 9.2 | 9.7 | 10.6 |
| Stress at 300% Strain, MPa | 12.8 | 13.2 | 13.2 | 14.4 | 15.3 | 12.6 | 14.5 | 15.6 | 16.6 |
| Tensile Strength, MPa | 18.0 | 17.6 | 19.1 | 18.9 | 17.8 | 18.4 | 18.6 | 22.2 | 20.7 |
| Elongation at Break, % | 413 | 401 | 422 | 410 | 350 | 425 | 385 | 427 | 379 |
| Energy to Break, MPa | 38.1 | 36.7 | 41.0 | 38.4 | 32.3 | 39.4 | 36.9 | 48.4 | 40.3 |

| Compound No | 10K | 10L | 10M | 10N | 10P | 10Q | 10R | 10S |
|---|---|---|---|---|---|---|---|---|
| Ingredients, phr or (moles) | | | | | | | | |
| Zinc Dimethacrylate | 2 | 2 | 2 | 2 | 4 | 4 | 4 | 4 |
| 3-Mercaptopropyl-trimethoxy silane | 0.26 (.0013) | 0.51 (.0026) | 1.53 (.0078) | 3.32 (.0169) | 0.26 (.0013) | 0.51 (.0026) | 1.53 (.0078) | 3.32 (.0169) |
| Mooney Viscosity, ML-4', 100° C. | 56 | 54 | 58 | 62 | 55 | 57 | 56 | 64 |
| Curing Characteristics ODR at 150° C. | | | | | | | | |

TABLE X-continued

Effect of Zinc Dimethacrylate and 3-Mercaptopropyltrimethoxy Silane (A-189) on Tire Belt Skim-Type Compounds with Silica. Formulation (phr): NR 100; Zinc Oxide 10; Stearic Acid 2; Cab-o-sil 30; HAF 30; Tackifier 3; Oil 8; Resorcinol 2.4; Manobond 0.78; Crystex 6.25; DCBS 1; CTP 0.1; HiSil 5; Other ingredients as below:

| | | | | | | | | |
|---|---|---|---|---|---|---|---|---|
| T$_{min}$, inch lb. | 6.9 | 6.5 | 7.2 | 7.9 | 6.6 | 6.7 | 7.1 | 8.6 |
| T$_{max}$, inch lb. | 50 | 50 | 54 | 61 | 56 | 38 | 61 | 68 |
| t$_{s2}$, minutes | 4 | 4 | 3 | 2 | 4 | 4 | 3 | 2 |
| t$_{25}$, minutes | 9 | 9 | 7 | 5 | 8 | 8 | 7 | 5 |
| t$_{90}$, minutes | 24 | 25 | 21 | 18 | 23 | 23 | 21 | 20 |
| t$_{100}$, minutes | 50 | 47 | 42 | 38 | 40 | 38 | 40 | 40 |
| Physical Properties at 25° C. | | | | | | | | |
| Tan Delta | 0.366 | 0.314 | 0.362 | 0.341 | 0.383 | 0.346 | 0.345 | 0.334 |
| E*, MPa | 19.6 | 19.0 | 21.9 | 25.6 | 20.0 | 21.8 | 24.3 | 31.0 |
| Hardness, Shore A | 81 | 79 | 82 | 85 | 82 | 82 | 82 | 87 |
| Stress at 10% Strain, MPa | 1.1 | 1.1 | 1.4 | 1.6 | 1.2 | 1.3 | 1.4 | 1.8 |
| Stress at 50% Strain, MPa | 2.4 | 2.4 | 3.1 | 3.6 | 2.7 | 3.1 | 3.2 | 4.0 |
| Stress at 100% Strain, MPa | 4.1 | 4.2 | 5.3 | 6.3 | 4.5 | 5.3 | 5.3 | 6.8 |
| Stress at 200% Strain, MPa | 8.5 | 9.0 | 11.0 | 12.9 | 9.3 | 10.9 | 10.9 | 13.6 |
| Stress at 300% Strain, MPa | 13.5 | 14.4 | 16.5 | 18.9 | 14.5 | 16.4 | 16.6 | — |
| Tensile Strength, MPa | 19.6 | 20.4 | 21.3 | 20.5 | 19.5 | 20.6 | 20.1 | 18.5 |
| Elongation at Break, % | 426 | 417 | 400 | 331 | 405 | 388 | 368 | 278 |
| Energy to Break, MPa | 42.8 | 43.1 | 45.3 | 36.4 | 41.1 | 42.4 | 38.8 | 27.6 |

TABLE XI

Effect of Zinc Dimethacrylate and Bis-(3-[triethoxysilyl]-propyl)-tetrasulfane on Tire Belt Skim-Type Compounds with Silica Formulation (phr): NR 100; Zinc Oxide 10; Stearic Acid 2; Cab-o-sil 30; HAF 30; Tackifier 3; Oil 8; Resorcinol 2.4; Manobond .78; Crystex 6.25; DCBS 1; CTP 0.1; HiSil 5; WS300 2.0; Cyrez 3.3; Other Ingredients as below:

| Compound No. | 11A | 11B | 11C | 11D | 11E | 11F | 11G | 11H |
|---|---|---|---|---|---|---|---|---|
| Ingredients, phr or (moles) | | | | | | | | |
| Zinc Dimethacrylate | — | 2 | 3 | 4 | 6 | — | — | — |
| Bis-(3-[triethoxysilyl]-propyl)-tetrasulfane 50% Active = x 50 S | — | — | — | — | — | 1.5 (0.0013) | 3.0 (0.0026) | 4.5 (0.0039) |
| Mooney Viscosity, ML-4', 100° C. | 60 | 53 | 56 | 47 | 52 | 61 | 70 | 61 |
| Curing Characteristics ODR at 150° C. | | | | | | | | |
| T$_{min}$, inch lb. | 7.4 | 5.9 | 5.9 | 5.0 | 5.5 | 8.0 | 8.6 | 7.6 |
| T$_{max}$, inch lb. | 45 | 50 | 49 | 52 | 57 | 46 | 44 | 50 |
| t$_{s2}$, minutes | 4 | 5 | 6 | 6 | 5 | 4 | 5 | 4 |
| t$_{25}$, minutes | 17 | 11 | 11 | 10 | 9 | 14 | 5 | 12 |
| t$_{90}$, minutes | 60 | 30 | 27 | 26 | 26 | 45 | 40 | 33 |
| t$_{100}$, minutes | 105 | 65 | 50 | 45 | 40 | 85 | 80 | 70 |
| Physical Properties at 25° C. | | | | | | | | |
| Tan Delta | 0.347 | 0.349 | 0.321 | 0.339 | 0.305 | 0.317 | 0.331 | 0.320 |
| E*, MPa | 21.0 | 20.8 | 18.5 | 19.7 | 22.9 | 20.5 | 18.3 | 25.4 |
| Hardness, Shore A | 80 | 80 | 81 | 82 | 85 | 83 | 80 | 81 |
| Stress at 10% Strain, MPa | 1.2 | 1.2 | 1.2 | 1.2 | 1.4 | 1.2 | 1.0 | 1.1 |
| Stress at 50% Strain, MPa | 2.4 | 2.6 | 2.5 | 2.8 | 3.1 | 2.6 | 2.4 | 2.7 |
| Stress at 100% Strain, MPa | 3.8 | 4.1 | 4.1 | 4.6 | 4.9 | 4.3 | 4.1 | 4.9 |
| Stress at 200% Strain, MPa | 8.0 | 8.3 | 8.3 | 9.2 | 9.7 | 9.3 | 9.2 | 10.7 |
| Stress at 300% Strain, MPa | 12.8 | 13.2 | 13.2 | 14.4 | 15.3 | 14.7 | 15.2 | 16.6 |
| Tensile Strength, MPA | 18.0 | 17.6 | 19.1 | 18.9 | 17.8 | 19.8 | 20.4 | 20.3 |
| Elongation at Break, % | 413 | 401 | 422 | 410 | 350 | 405 | 393 | 375 |
| Energy to Break, MPa | 38.1 | 36.7 | 41.0 | 38.4 | 32.3 | 41.2 | 39.7 | 39.4 |

TABLE XI-continued

Effect of Zinc Dimethacrylate and Bis-(3-[triethoxysilyl]-
propyl)-tetrasulfane on Tire Belt Skim-Type Compounds with Silica
Formulation (phr): NR 100; Zinc Oxide 10; Stearic Acid 2;
Cab-o-sil 30; HAF 30; Tackifier 3; Oil 8; Resorcinol 2.4;
Manobond .78; Crystex 6.25; DCBS 1; CTP 0.1; HiSil 5;
WS300 2.0; Cyrez 3.3; Other Ingredients as below:

| Compound No. | 11J | 11K | 11L | 11M | 11N | 11P | 11Q |
|---|---|---|---|---|---|---|---|
| Ingredients, phr or (moles) | | | | | | | |
| Zinc Dimethacrylate | — | 2 | 3 | 4 | 6 | 3 | 4 |
| Bis-(3-[triethoxysilyl]-propyl)-tetrasulfane 50% Active = x 50 S | 9.7 (0.0083) | 1.5 (0.0013) | 1.5 (0.0013) | 1.5 (0.0013) | 1.5 (0.0013) | 3.0 (0.0026) | 3.0 (0.0026) |
| Mooney Viscosity, ML-4', 100° C. | 61 | 67 | 63 | 60 | 63 | 64 | 68 |
| Curing Characteristics ODR at 150° C. | | | | | | | |
| $T_{min}$, inch lb. | 7.7 | 7.7 | 7.4 | 6.9 | 7.2 | 7.4 | 8.2 |
| $T_{max}$, inch lb. | 55 | 48 | 50 | 52 | 57 | 54 | 58 |
| $t_{s2}$, minutes | 4 | 6 | 5 | 5 | 5 | 5 | 4 |
| $t_{25}$, minutes | 11 | 11 | 9 | 9 | 8 | 8 | 8 |
| $t_{90}$, minutes | 29 | 27 | 24 | 23 | 24 | 22 | 23 |
| $t_{100}$, minutes | 60 | 51 | 40 | 39 | 42 | 42 | 41 |
| Physical Properties at 25° C. | | | | | | | |
| Tan Delta | 0.347 | 0.288 | 0.230 | 0.252 | 0.321 | 0.269 | 0.280 |
| E*, MPa | 28.9 | 18.6 | 18.5 | 19.1 | 24.4 | 21.5 | 24.0 |
| Hardness, Shore A | 85 | 81 | 79 | 81 | 82 | 83 | 84 |
| Stress at 10% Strain, MPa | 1.4 | 1.2 | 1.0 | 1.1 | 1.2 | 1.2 | 1.3 |
| Stress at 50% Strain, MPa | 3.6 | 2.7 | 2.4 | 2.6 | 3.1 | 2.8 | 3.2 |
| Stress at 100% Strain, MPa | 6.2 | 4.6 | 4.3 | 4.5 | 5.6 | 4.9 | 5.6 |
| Stress at 200% Strain, MPa | 12.8 | 9.8 | 9.4 | 9.5 | 11.8 | 10.5 | 11.6 |
| Stress at 300% Strain, MPa | — | 15.5 | 15.3 | 15.1 | 17.9 | 16.4 | 17.6 |
| Tensile Strength, MPA | 18.0 | 22.3 | 21.3 | 20.7 | 20.1 | 19.9 | 20.4 |
| Elongation at Break, % | 289 | 432 | 401 | 402 | 339 | 363 | 351 |
| Energy to Break, MPa | 27.9 | 50.0 | 42.3 | 42.4 | 35.2 | 37.2 | 37.5 |

Tables X and XI show that silanes reduce cure time and increase moduli and the amount of zinc dimethacrylate added can be reduced by the addition of silanes.

All the rubber compounds were mixed by conventional means on a Banbury mixer in a two stage or three stage mix. A two roll mill may also be used. In most cases, the rubber, fillers (carbon black, silica), stearic acid, oil, zinc oxide, and some other optional ingredients were mixed in the first stage at temperatures ranging from 260° F. to 320° F. Some optional ingredients, e.g. resorcinol, were added in the second stage. The curatives were always added in the final stage where drop temperatures were about 190° F. The zinc dimethacrylate was added in the second or final stage but in some cases it could also be added in the first stage although more might be necessary to achieve the same results on desired properties.

Thus, it can be seen that an extremely useful composition for reinforced rubber products, such as tire belts can be provided in a sulphur curing butadiene or natural rubber system by the addition of both carbon black and silica in combination with the use of a metallic salt of a low molecular weight unsaturated organic acid such as zinc dimethacrylate. Optionally, certain other additives such as silanes, can be added to the composition which will contribute to further modifications of certain properties such as scorch time, total cure time, modulus and tear properties including fatigue crack propagation resistance. Tire belts formed from this skim utilizing brass plated steel cords are one preferred end product use of this composition. However, other products such as conveyor belts and hoses which are reinforced by steel or other reinforcing cords and other rubber products without steel reinforcements can be manufactured as end products.

While several embodiments of this invention have been shown and described, various adaptations can be made without departing from the scope of the invention as defined in the appended claims.

Having this described the preferred embodiment, the invention is now claimed to be:

1. A compounded elastomeric composition comprising:
   a. 100 parts by weight of an elastomer selected from the group of
      i. natural rubber,
      ii. butadiene rubber,
      iii. copolymers of butadiene rubber, and
      iv. mixtures thereof;
   b. an effective amount of at least 20 parts per hundred (of rubber) of carbon black;
   c. an effective amount of at least 10 parts per hundred (of rubber) of fumed silica;
   d. a sulfur containing vulcanizing agent; and e. an effective amount up to about 12 parts per hundred (of rubber) of a metal salt of a low molecular weight unsaturated organic acid.

2. The composition of claim 1 wherein said metal salt is zinc dimethacrylate.

3. The composition as defined in claim 1 wherein said elastomer is natural rubber.

4. The composition as defined in claim further characterized by an effective amount of a silane.

5. The composition of claim 2 wherein there is up to about 6 parts per hundred of zinc dimethacrylate.

6. The composition of claim 2 wherein there is between about 2 and about 4 parts per hundred of zinc dimethacrylate.

7. The composition of claim 2 wherein there is about 3 parts per hundred of zinc dimethacrylate.

8. The composition of claim 1 wherein there is between about 20 and about 80 parts per hundred (of rubber) of carbon black and between about 10 and about 80 parts per hundred (of rubber) of silica.

9. The composition of claim 1 wherein there is between about 25 and about 50 parts per hundred (of rubber) of carbon black and between about 25 and about 35 parts per hundred (of rubber) of silica.

10. The composition of claim 1 wherein there is about 30 parts per hundred (of rubber) of silica and about 30 parts per hundred (of rubber) of carbon black.

11. The composition of claim 8 wherein there is between 2 and 4 parts per hundred of zinc dimethyacrylate as the metal salt.

12. The composition as defined in claim 11 wherein there is up to about 0.04 mole of a silane per hundred parts by weight rubber.

13. The composition of claim 10 wherein there is about 3 parts per hundred of zinc dimethacrylate as the metal salt.

14. A reinforced elastomeric composition comprising:
   a. an elastomeric composition including:
      i. 100 parts by weight of an elastomer selected from the group of
         (1) natural rubber,
         (2) butadiene rubber, and
         (3) copolymer of butadiene rubber, and
         (4) mixtures thereof;
      ii. an effective amount of at least 20 parts per hundred (of rubber) of carbon black;
      iii. an effective amount of at least 10 parts per hundred (of rubber) of fumed silica;
      iv. a sulfur containing vulcanizing agent;
      v. an effective amount up to about 12 parts per hundred (of rubber) of a metal salt of a low molecular weight unsaturated organic acid; and
   b. reinforcing cords in said elastomeric composition.

15. The reinforced composition of claim 14 wherein the reinforced composition is a tire belt.

16. The reinforced composition of claim 14 wherein the cords are steel.

17. The reinforced composition of claim 16 wherein the reinforced composition is a tire belt.

18. The tire belt of claim 17 wherein said reinforcing cords are brass plated steel.

19. The composition of claim 14 wherein there is up to about 6 parts per hundred of zinc dimethacrylate as the metal salt.

20. The composition of claim 19 wherein there is between about 2 and about 4 parts per hundred of zinc dimethacrylate.

21. The composition of claim 19 wherein there is about 3 parts per hundred of zinc dimethacrylate.

22. The composition of claim 14 wherein there is between about 20 and about 80 parts per hundred (of rubber) of carbon black and between about 10 and about 80 parts per hundred (of rubber) of silica.

23. The composition of claim 14 wherein there is between about 25 and about 50 parts per hundred (of rubber) of carbon black and between about 25 and about 35 parts per hundred (of rubber) of silica.

24. The composition of claim 14 wherein there is about 30 parts per hundred (of rubber) of silica and about 30 parts per hundred (of rubber) of carbon black.

25. The composition of claim 22 wherein there is between 2 and 4 parts per hundred of zinc dimethacrylate as the metal salt.

26. The composition as defined in claim 25 wherein there is up to about 0.04 mole of a silane per hundred parts by weight of rubber.

27. The composition of claim 14 wherein said metal salt is zinc dimethacrylate.

28. The composition of claim 27 wherein there is about 3 parts per hundred of zinc dimethacrylate.

29. The composition as defined in claim 14 wherein said elastomer is natural rubber.

30. The composition as defined in claim 14 further characterized by an effective amount of a silane.

* * * * *